(12) United States Patent
Perez Garcia

(10) Patent No.: US 6,875,413 B2
(45) Date of Patent: Apr. 5, 2005

(54) SULFUR DIOXIDE PLANT

(76) Inventor: Javier Angel Perez Garcia, Villa Santa Rosa Lote N° 8, Los Angeles (CL)

(*) Notice: Subject to any disclaimer, the term of this patent is extended or adjusted under 35 U.S.C. 154(b) by 0 days.

(21) Appl. No.: 10/157,044

(22) Filed: May 30, 2002

(65) Prior Publication Data

US 2002/0197573 A1 Dec. 26, 2002

(30) Foreign Application Priority Data

May 31, 2001 (CL) .......................................... 1267-2001

(51) Int. Cl.[7] .............................................. C01B 17/54
(52) U.S. Cl. ...................................................... 423/543
(58) Field of Search ................................ 423/522, 529, 423/543, 659

(56) References Cited

U.S. PATENT DOCUMENTS

| | | | | |
|---|---|---|---|---|
| 3,988,428 | A | * 10/1976 | Dorr et al. ................... | 423/543 |
| 4,225,566 | A | * 9/1980 | deVries ....................... | 423/659 |
| 4,578,262 | A | * 3/1986 | Cameron ..................... | 423/522 |
| 4,663,145 | A | * 5/1987 | Van den Berk et al. .... | 423/659 |
| 5,194,239 | A | * 3/1993 | Masseling et al. .......... | 423/522 |
| 5,711,018 | A | * 1/1998 | Hittner et al. .............. | 423/659 |

FOREIGN PATENT DOCUMENTS

| DE | 27 09 455 B1 | * 5/1978 | ................. 423/543 |
|---|---|---|---|
| GB | 1414258 | * 11/1975 | ................. 423/543 |

* cited by examiner

*Primary Examiner*—Wayne A. Langel
(74) *Attorney, Agent, or Firm*—Jacobson Holman PLLC

(57) ABSTRACT

Production of sulfur dioxide by means of the combustion of sulfur and pure oxygen in a closed system that produces a high yield in the recovery of $SO_2$ and reduces environmental contamination to levels below the standard requirements. Sulfur dioxide is produced by burning sulfur and pure oxygen diluted in recirculated combustive gas that has been previously cooled in order to maintain combustion at less than 1200° C. The gaseous mix thus obtained would be comprised of approximately 16% V/V oxygen and 84% V/V of $SO_2$. This latter percentage makes it very easy to liquefy $SO_2$ so that a 95% $SO_2$ recovery efficiency would be obtained at −10° C. The non-liquefied gas is recirculated in a closed system. The $SO_2$ content in the 84% V/V $SO_2$ gas could even be liquefied at 20° C., at 5 bar, thus increasing the system's efficiency even further.

9 Claims, 1 Drawing Sheet

SULFUR DIOXIDE PLANT

BACKGROUND

Figure 1:
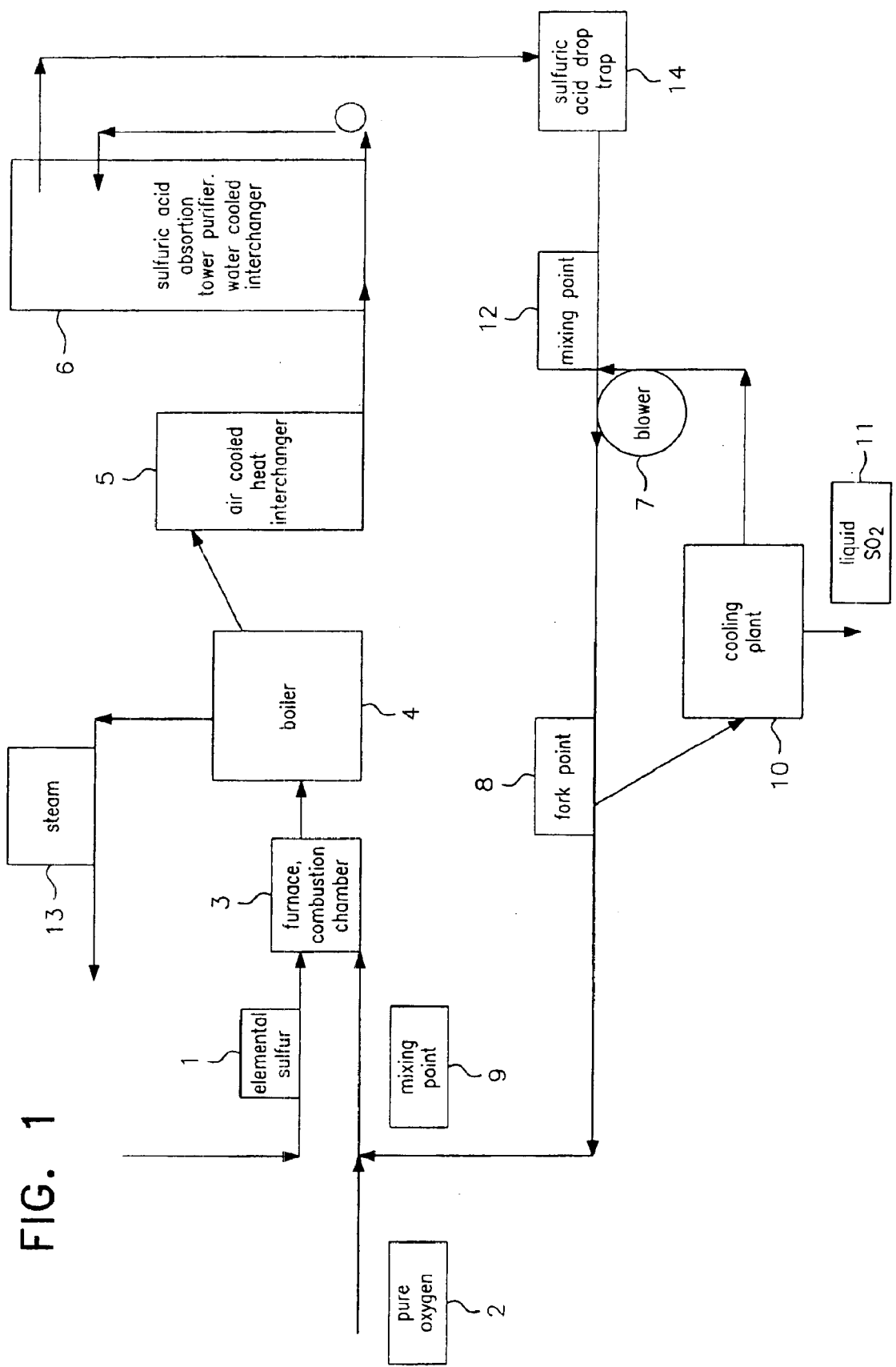

Sulfur is generally burned with dry air in a combustion chamber in the production of sulfur dioxide, obtaining a gas of 80% V/V of nitrogen, 18% V/V of $SO_2$, the rest being oxygen and inert gases. This gas is then liquefied at a temperature of $-50°$ C. at a pressure of 0.8 bar. Greater pressure is required to liquefy this product at a higher temperature. The $SO_2$ recovery efficiency achieved through the liquefication of this gas is approximately 75%. The rest of the non-liquefied $SO_2$ gas, excess oxygen not burned and inert gases must be eliminated from the process line. If this mix is discharged into the atmosphere, contamination is heavy and a costly neutralization procedure is required to reduce contamination.

SUMMARY OF THE INVENTION

Production of sulfur dioxide by means of the combustion of sulfur and pure oxygen in a closed system that produces a high yield in the recovery of $SO_2$ and reduces environmental contamination to levels below the standard requirements. Sulfur dioxide is produced by burning sulfur and pure oxygen diluted in recirculated combustive gas that has been previously cooled in order to maintain combustion ai less than $1200°$ C. The gaseous mix thus obtained would be comprised of approximately 16% V/V oxygen and 84% V/V of $SO_2$. This latter percentage makes it very easy to liquefy $SO_2$ so that a 95% $SO_2$ recovery efficiency would be obtained at $-10°$ C. The non-liquefied gas is recirculated in a closed system. The $SO_2$ content in the 84% V/V/$SO_2$ gas could even be liquefied at $20°$ C., at 5 bar, thus increasing the system's efficiency even farther.

DRAWING

FIG. 1 is a flow diagram of the process.

DETAILS

Elemental sulfur is smelted in a furnace (combustion chamber) and further combusted with pure oxygen diluted with cold combustion gas in a sulfur burner (boiler) in which it is cooled to a temperature of $140°$ C. At that temperature, it has a viscosity appropriate for pumping. The cold combustion gas comes from recirculation of a fraction of the combustion gas which may contain additional unused oxygen.

Recirculation is used to maintain gas leaving the combustion chamber at a temperature of less than $1,200°$ C. Otherwise, combustion of sulfur and pure oxygen in sotichiometric quantities would produce an excessively high temperature (more than $5,000°$ C.). Thus, obtained combustion gas has about 80% V/V of $SO_2$.

Gas from the combustion chamber is cooled to $180°$ C. by passing through the boiler, which produces steam at 4 bar, which is used to heat sulfur in liquefaction tanks.

The combustion gas is passed through an air-cooled heat interchanger, where it is cooled to $80°$ C., after which it is passed through a sulfuric acid absorption tower, in which it is cooled to room temperature, and moisture and sulfur particles are eliminated. Sulfuric acid used in the tower is maintained at room temperature, using a water-cooled heat interchanger. Gas, thus purified, is passed through a sulfuric acid drop trap.

To this point, the entire operating line is maintained at a negative pressure; the gasses thus circulate by suction from a blower that pushes the gas mass (70–95% of the mass) toward the combustion furnace and toward the cooling plant (remaining 5–30%).

Liquid $SO_2$ is obtained from the cooling plant. A non-condensable gaseous mix of $SO_2$ and unused oxygen is suctioned by the negative pressure from the blower. A drop in temperature helps to reduce the temperature of gas recirculated to the boiler even further. The entire gas circulation system is thus made in a completely closed circuit.

In view of the high concentration of reduced $SO_2$, high $SO_2$ recovery efficiencies are obtained by liquefaction in a cooling plant, depending on different operating pressure and temperature conditions of the plant. For example, a 95% recovery of $SO_2$ contained in 80% $SO_2$ gas at $20°$ C. and 0.8 bar can be achieved. That same recovery is possible with 80% $SO_2$ gas at $20°$ C. and 3.4 bar.

For a better explanation of the invention, a description is provided below of a preferred embodiment in relation to FIG. 1, which represents a generic preferred process diagram.

Flow lines 1 and 2 correspond to sulfur and pure oxygen, respectively. The sulfur in the flow line is smelted in furnace 3 and continues toward the sulfur burner in boiler 4. Combustion gas obtained in the boiler 4, displaced by suction from blower 7, passes to an air cooled heat interchanger 5 and then continues to a purifier and cooler 6. The mass of gas is driven from blower 7 toward the fork point 8 where part is conveyed to mixing point 9, at which it is incorporated with oxygen fed in line 2 and conveyed toward boiler 4. The remaining mass of gas at fork point 8 is conveyed to cooling plant 10. The product current 11 is obtained in the form of liquid $SO_2$ and a non-condensable gaseous mix that is suctioned by the negative pressure of blower 7 is returned to the circuit via mixing point 12.

What is claimed is:

1. A substantially dry method for obtaining sulfur dioxide from elemental sulfur and pure oxygen which comprises:
   a) smelting elemental sulfur,
   b) admixing pure oxygen and cooled gas with the smelted elemental sulfur,
   c) combusting the smelted elemental sulfur with said pure oxygen and cooled gas,
   d) passing obtained combustion gas sequentially through an air interchanger, a purifier and a cooler,
   e) maintaining a negative pressure to move produced gas by suction throughout the preceding steps,
   f) recycling part of the cooled gas from step (d) to step (b), and transmitting the remainder of the cooled gas to a cooling plant,
   g) recycling non-condensable gas from the cooling plant to the cooled gas from step (d), and
   h) forming liquid $SO_2$ in the cooling plant and extracting the liquid $SO_2$ therefrom.

2. A method according to claim 1 which comprises cooling gas from step (c) to $180°$ C. by passing it through a boiler.

3. A process of claim 1, which further comprises liquefying sulfur with steam at 4 bar produced from step (c).

4. A method according to claim 1 which comprises maintaining gas from step (c) at a temperature of less than $1,200°$ C.

5. A process according to claim 1, which comprises obtaining combustion gas which is 80% $SO_2$.

6. A process according to claim 5 which comprises purifying and cooling obtained combustion gas to ambient temperature.

7. A method according to claim 1 which comprises recirculating 70% to 95% wt/vol of purified and cooled combustion gas to step (a).

8. A method according to claim 1 which further comprises sending around 20% of purified and cooled combustion gas to the cooling plant to obtain liquid $SO_2$ to a non-condensable gaseous mix of $SO_2$ and unused oxygen.

9. A method according to claim 1 wherein the negative pressure maintains a gas circulation system in a completely closed circuit.

* * * * *